US011717081B1

(12) United States Patent
Feng

(10) Patent No.: US 11,717,081 B1
(45) Date of Patent: Aug. 8, 2023

(54) SMOOTHLY ADJUSTABLE ARTBOARD

(71) Applicant: DongGuan KINGEASY Hardware Technology CO., LTD, Dongguan (CN)

(72) Inventor: Bo Feng, Dongguan (CN)

(73) Assignee: DongGuan KINGEASY Hardware Technology CO., LTD, Dongguan (CN)

( * ) Notice: Subject to any disclaimer, the term of this patent is extended or adjusted under 35 U.S.C. 154(b) by 0 days.

(21) Appl. No.: 17/721,210

(22) Filed: Apr. 14, 2022

(30) Foreign Application Priority Data

Mar. 28, 2022 (CN) .......................... 202210316404.6

(51) Int. Cl.
*A47B 27/14* (2006.01)
*A47B 27/06* (2006.01)
(52) U.S. Cl.
CPC .............. *A47B 27/14* (2013.01); *A47B 27/06* (2013.01)
(58) Field of Classification Search
CPC ................................ A47B 27/06; A47B 27/14
USPC ............................................................. 108/1
See application file for complete search history.

(56) References Cited

U.S. PATENT DOCUMENTS

| | | | | |
|---|---|---|---|---|
| 1,384,861 A * | 7/1921 | Schingel | ................ | A47B 23/02 248/454 |
| 1,460,697 A * | 7/1923 | Bendlin | ................ | A47B 27/06 403/56 |
| 2,988,843 A * | 6/1961 | Knudsen | ................ | A47B 27/08 108/4 |
| 3,064,530 A * | 11/1962 | Vigano | ................ | G02C 5/2227 351/113 |
| 3,161,159 A * | 12/1964 | Kritske | ................ | A47B 27/18 108/2 |
| 3,543,312 A * | 12/1970 | Pofferi | ................ | A47B 23/02 108/49 |
| 3,625,160 A * | 12/1971 | Bergman | ................ | A47B 27/06 108/2 |
| 3,874,309 A * | 4/1975 | Cowley | ................ | A47B 27/00 108/2 |
| 3,903,812 A * | 9/1975 | Cowley | ................ | A47B 27/06 108/150 |
| 3,908,560 A * | 9/1975 | Horner | ................ | A47B 27/06 108/4 |
| 4,682,749 A * | 7/1987 | Strater | ................ | F16M 11/2021 248/592 |

(Continued)

*Primary Examiner* — Daniel J Troy
*Assistant Examiner* — Timothy M Ayres
(74) *Attorney, Agent, or Firm* — Jeenam Park

(57) ABSTRACT

A smoothly adjustable artboard comprises: a base configured for fixing, an adjusting bracket configured to adjust the height and angle of the artboard, and a painting plate configured to place drawing paper, and the adjusting bracket is arranged between the base and the painting plate, wherein the adjusting bracket includes a connecting seat, a connecting bracket, a force applying mechanism, a cam member, a roller and a one-way limiting mechanism, the roller is rotatably arranged on the connecting bracket and is located at one end close to the base, and one end of the force applying mechanism is connected with the connecting seat, and the other end of the force applying mechanism is connected with the cam member, wherein a curved surface of the cam member is configured to press against the roller under the pushing action of the force applying mechanism.

9 Claims, 7 Drawing Sheets

(56) References Cited

U.S. PATENT DOCUMENTS

| | | | | |
|---|---|---|---|---|
| 6,672,553 | B1 * | 1/2004 | Lin | F16M 11/2064 |
| | | | | 248/921 |
| 6,766,563 | B2 * | 7/2004 | Lee | E05F 1/1261 |
| | | | | 16/335 |
| 7,252,277 | B2 * | 8/2007 | Sweere | F16M 11/24 |
| | | | | 248/371 |
| 8,296,906 | B2 * | 10/2012 | Wisniewski | E05D 3/14 |
| | | | | 16/302 |
| 8,672,277 | B2 * | 3/2014 | Hsu | F16M 11/38 |
| | | | | 248/371 |
| 8,931,748 | B2 * | 1/2015 | Bowman | F16M 13/022 |
| | | | | 248/917 |
| 10,345,851 | B2 * | 7/2019 | Park | F16M 11/2092 |
| 10,754,391 | B2 * | 8/2020 | Park | E05D 5/10 |
| 2007/0240282 | A1 * | 10/2007 | Nishida | E05D 7/12 |
| | | | | 16/223 |
| 2013/0021723 | A1 * | 1/2013 | Harper | F16M 11/10 |
| | | | | 361/679.01 |

\* cited by examiner

SMOOTHLY ADJUSTABLE ARTBOARD

CROSS-REFERENCE TO RELATED APPLICATIONS

This application claims the benefit and priority of Chinese patent application No. 202210316404.6, filed on Mar. 28, 2022, disclosure of which is hereby incorporated by reference in its entirety.

TECHNICAL FIELD

The present application relates to the technical field of artboards, and in particular, to an artboard that can be adjusted smoothly.

BACKGROUND

In recent years, with the continuous development of society and the continuous progress of scientific level, artboards are often used to assist in painting. However, now the artboard often uses a fixed structure and cannot be adjusted. Therefore, those skilled in the art have developed an adjustable artboard. However, the existing adjustable artboard still has problem that the adjustment is not smooth, and the artboard and the adjusting bracket are not fixedly stable during painting.

Therefore, there is an urgent need on the market for a smoothly adjustable artboard to solve this problem.

SUMMARY

In view of the deficiencies in the prior art, the present application proposes a smoothly adjustable artboard. In this application, a force applying mechanism and a one-way limiting mechanism are newly added, which can prevent the artboard from being unstable in adjustment and difficult to move during adjustment, and has strong practicability.

To achieve the above object, the present application adopts the following technical scheme:

A smoothly adjustable artboard, comprising: a base configured for fixing, an adjusting bracket configured to adjust the height and angle of the artboard, and a painting plate configured to place drawing paper, and the adjusting bracket is arranged between the base and the painting plate, wherein the adjusting bracket includes a connecting seat, a connecting bracket, a force applying mechanism, a cam member, a roller and a one-way limiting mechanism, the roller is rotatably arranged on the connecting bracket and is located at one end close to the base, and one end of the force applying mechanism is connected with the connecting seat, and the other end of the force applying mechanism is connected with the cam member, wherein a curved surface of the cam member is configured to press against the roller under the pushing action of the force applying mechanism.

As a further elaboration on the above technical solutions:

In the above technical solution, the force applying mechanism comprises a pressure spring, and one end of the pressure spring abuts against the cam member.

In the above technical solution, the force applying mechanism further comprises a limiting sleeve, an inner diameter of the limiting sleeve is configured to adapt to an outer diameter of the pressure spring, and the limiting sleeve is configured to cover on outside of the pressure spring.

In the above technical solution, the limiting sleeve is configured to be a flexible sleeve.

In the above technical solution, the force applying mechanism further comprises an adjusting screw and an adjusting moving block, and one end of the adjusting screw is configured to clamp with the connecting seat by screw head, the adjusting moving block is configured to screw on the adjusting screw, the pressure spring is configured to sleeve on outside of the adjusting screw, and both ends of the pressure spring are configured to abut between the adjusting moving block and the cam member.

In the above technical solution, the one-way limit mechanism comprises a one-way gear and a one-way limiting device, the one-way gear is configured to be used in cooperation with the one-way limiting device, and the connecting bracket is configured to pivotally connect to the base by a first rotating shaft, and the one-way gear is configured to sleeve on the first rotating shaft, the one-way limiting device is arranged on the base, and the connecting bracket is rotatably arranged on upper end of the base by the first rotating shaft, the one-way gear and the one-way limiting device.

In the above technical solution, the one-way limiting device comprises a limiting member and a reset spring, the return spring is arranged inside the base, and one end of the limiting member is connected with the reset spring, the other end of the limiting member is configured to expose outside the base, and a gear rack matched with helical teeth of the one-way gear is arranged on the limiting member.

In the above technical solution, a flipping adjusting device is arranged between the painting plate and the connecting seat, and the flipping adjusting device comprises a flipping seat, a second rotating shaft, a torsion spring and an adjusting rod, the flipping seat is configured to pivotally connect to the connecting seat by a second rotating shaft, the torsion spring is configured to be wound around the second rotating shaft, and the adjusting rod is configured to connect with the torsion spring, the torsion spring is configured to loosen the second rotating shaft when the adjusting rod is toggled, and the second rotating shaft is configured to be locked by the torsion spring when the adjusting rod is loosened.

In the above technical solution, a rotating adjusting device is arranged between the flipping adjusting device and the painting plate, the rotating adjusting device comprises a rotating disc, a clamping column and a limiting block, and one side of the rotating disc is arranged on the flipping seat, and an oval clamping slot is provided in the middle of the flipping seat, the clamping cylinder comprises a clamping cylinder and a clamping plate, the clamping cylinder is arranged in the oval clamping slot, the clamping plate is arranged on upper end of the clamping cylinder, the width of the clamping plate is configured to be greater than outer diameter of the clamping cylinder, and other side of the rotating disk and the limiting block are fixed on back of the painting plate, a limiting clamping slot adapted to the clamping cylinder is arranged on the limiting block, and a notch is arranged on one side of the clamping slot, the clamping cylinder is configured to insert into the clamping slot from the notch, and the clamping plate is configured to be pressed on the limiting block, and the painting plate is configured to clamp at the clamping cylinder of the clamping column by the limiting clamping slot of the limiting block.

In the above technical solution, the clamping plate is configured in a racetrack-like structure.

DETAILED DESCRIPTION

Figure 1:
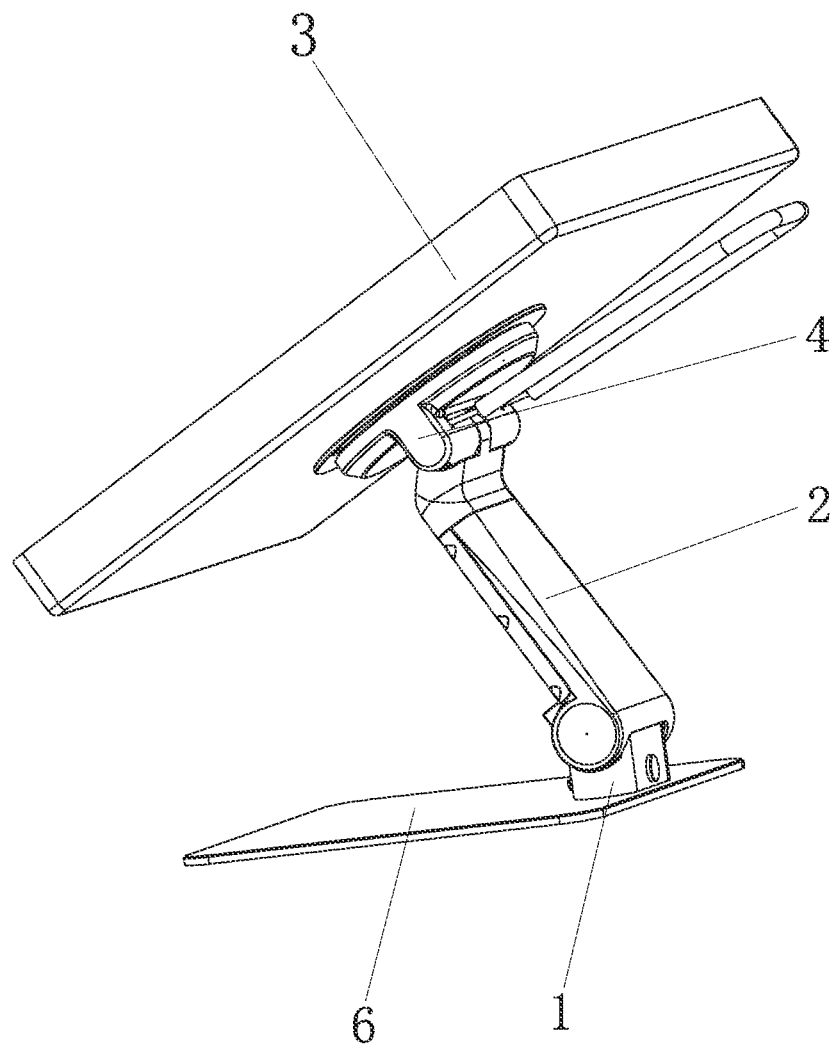
FIG. 1 is an overall schematic structural diagram of the present application.

In the description of the present application, it should be noted that the terms "center", "upper", "lower", "left", "right", "vertical", "horizontal", "inner", "outer", etc. which are used to indicate position or positional relationship are based on the position or positional relationship shown in the drawings, and are only for the convenience of describing the application and simplifying the description, rather than indicating or implying that the indicated position or element must have a specific orientation and be constructed in a specific orientation and operation, therefore cannot be understood as a limitation of the present application.

In the description of the present application, it should be noted that unless otherwise clearly specified and limited, the terms "installation", and "connection" should be understood in a broad sense, for example, it can be a fixed connection or a detachable connection, or integrally connected; it can be a mechanical connection or an electrical connection; it can be directly connected, or indirectly connected through an intermediate medium, and it can be the internal communication between two components. For those skilled in the art, the specific meaning of the above-mentioned terms in the present application can be understood according to the specific circumstances.

Figure 2:
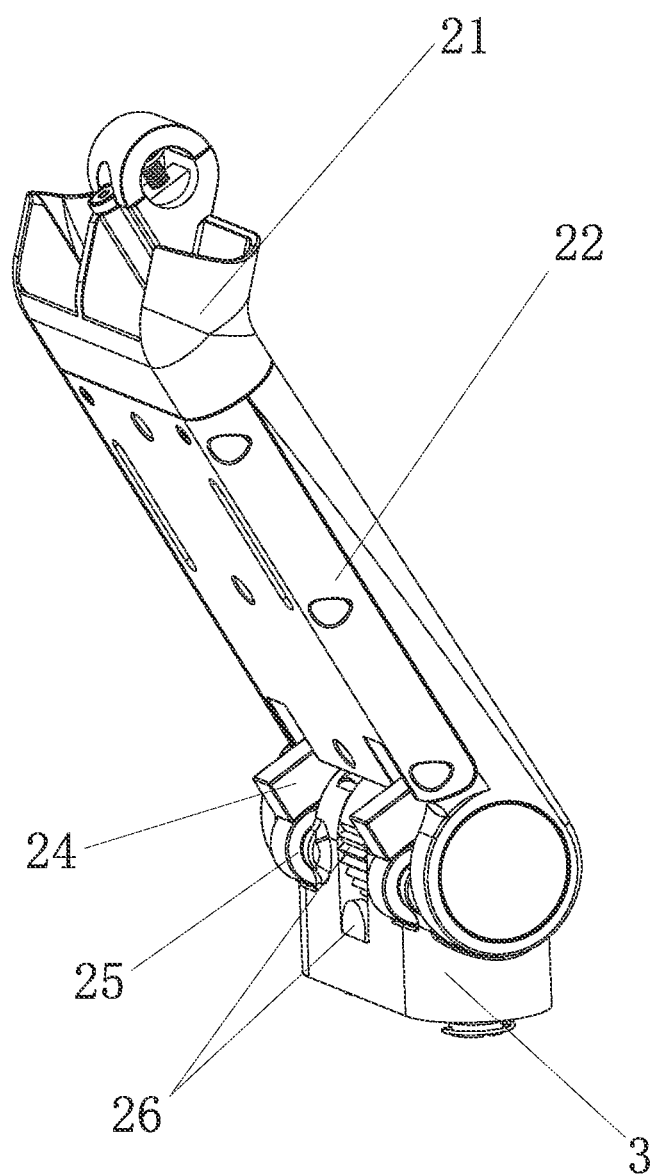
FIG. 2 is a schematic structural diagram of the adjusting bracket.
Figure 3:
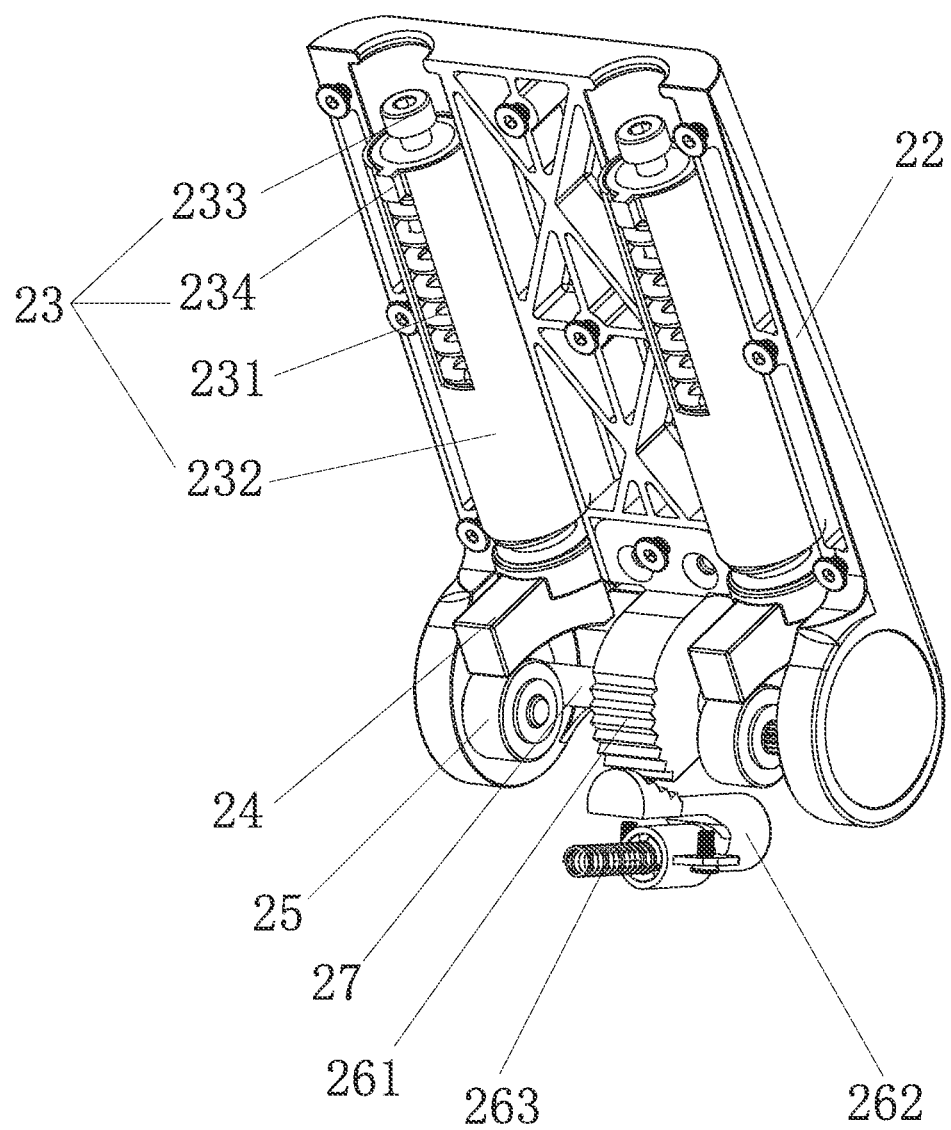
FIG. 3 is a partial schematic structural diagram of the adjusting bracket.
Figure 4:
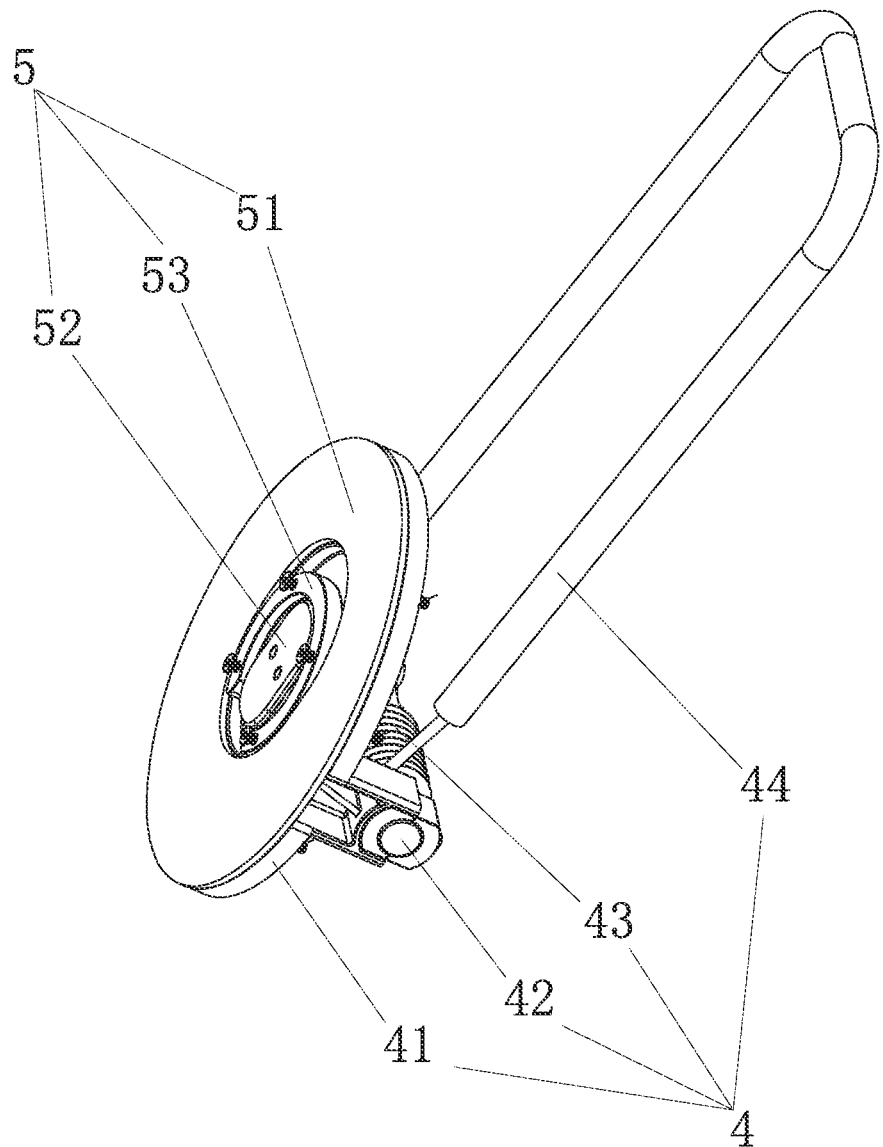
FIG. 4 is a schematic structural diagram of the flipping adjusting device and the rotating adjusting device.
Figure 5:
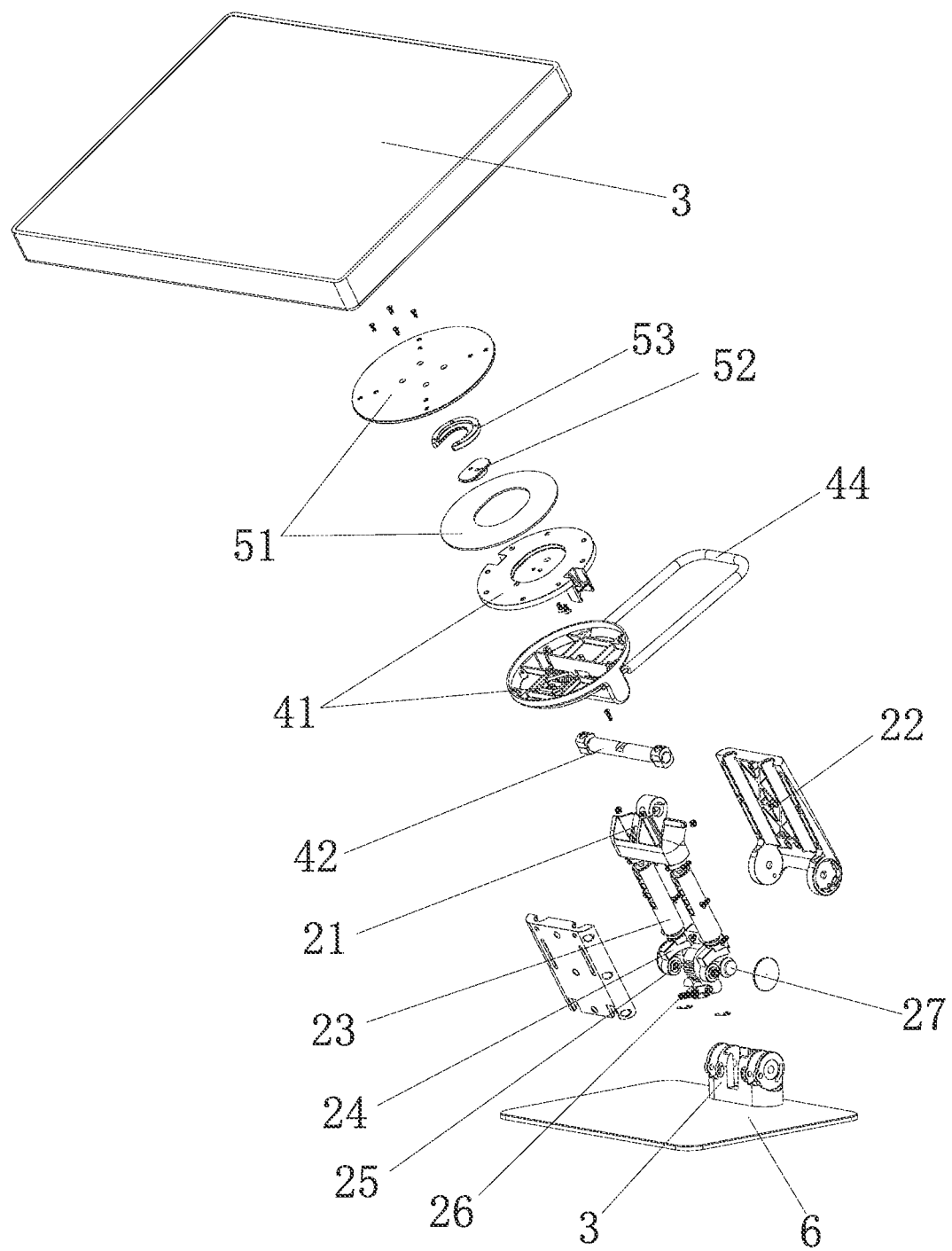
FIG. 5 is an exploded diagram of the present application.
Figure 6:
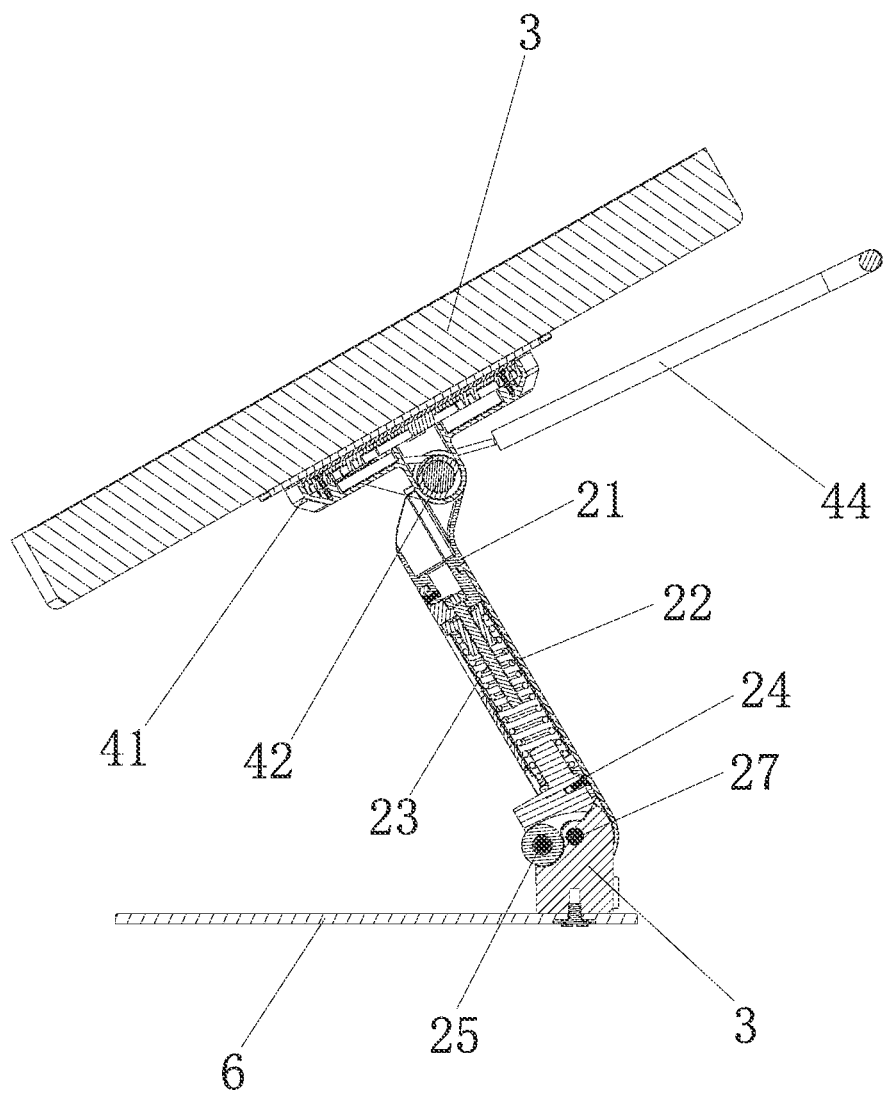
FIG. 6 is an internal structural sectional diagram of the present application.
Figure 7:
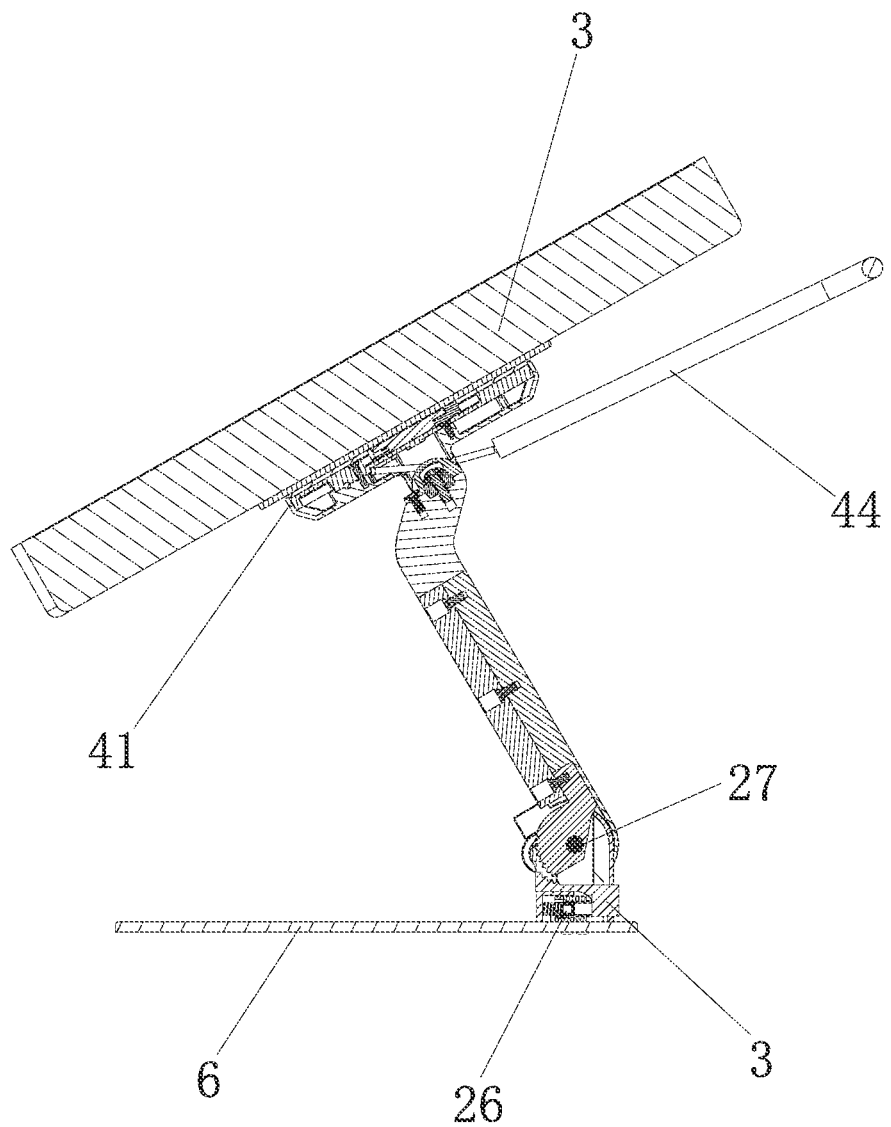
FIG. 7 is a sectional diagram of a screw connection structure of the present application.

As shown in FIGS. 1-7, a smoothly adjustable artboard comprises: a base 1 configured for fixing, an adjusting bracket 2 configured to adjust the height and angle of the painting plate 3, and the painting plate 3 configured to place drawing paper. The adjusting bracket 2 is arranged between the base 1 and the painting plate 3, wherein the adjusting bracket 2 includes a connecting seat 21, a connecting bracket 22, a force applying mechanism 23, a cam member 24, a roller 25 and a one-way limiting mechanism 26, the roller 25 is rotatably arranged on the connecting bracket 22 and is located at one end close to the base 1, and one end of the force applying mechanism 23 is connected with the connecting seat 21, and the other end of the force applying mechanism 23 is connected with the cam member 24, wherein a curved surface of the cam member 24 is configured to press against the roller 25 under the pushing action of the force applying mechanism 23. The force applying mechanism 23 provides a pushing force for the cam member 24, so that the curved surface of the cam member 24 is pressed against the roller 25 on the connecting bracket 22. The roller 25 will give the cam member 24 a supporting force, and the supporting force F will form an obliquely upward acting component F1 on the curved surface of the cam member 24. The acting component F1 is transmitted to the connecting seat 21 through the force applying mechanism 23 and the connecting bracket 22, so that the painting plate 3 can be carried on the connecting seat 21. When the weight T of the painting plate 3 is the same as the acting component F1, the painting plate 3 can stay in a certain position. Furthermore, since its acting component F1 at any position on the curved surface of the cam member is equal, the painting plate 3 carried on the connecting base 21 can be adjusted to stay at any height position, which brings stepless adjustment in use. The adjustment effect is convenient and random.

As a further improvement of the present application, the force applying mechanism 23 comprises a pressure spring 231, and one end of the pressure spring 231 abuts against the cam member 24.

In this embodiment, the stepless adjustment between the painting plate 3 and the connecting bracket 22 is realized by using the pressure spring 231 as the force applying mechanism 23.

As a further improvement of the present application, the force applying mechanism 23 further comprises a limiting sleeve 232, an inner diameter of the limiting sleeve 232 is configured to adapt to an outer diameter of the pressure spring 231, and the limiting sleeve 232 is configured to cover on outside of the pressure spring 232.

As a further improvement of the present application, the limiting sleeve 232 is configured to be a flexible sleeve.

In this embodiment, a limiting sleeve 232 is sleeved on the outside of the pressure spring 231, which can better limit the position of the pressure spring 231 under stress, and prevent the pressure spring 231 from being unstable due to deformation.

As a further improvement of the present application, the force applying mechanism 23 further comprises an adjusting screw 233 and an adjusting moving block 234, and one end of the adjusting screw 233 is configured to clamp with the connecting seat 21 by screw head, the adjusting moving block 234 is configured to screw on the adjusting screw 233, the pressure spring 231 is configured to sleeve on outside of the adjusting screw 233, and both ends of the pressure spring are configured to abut between the adjusting moving block 234 and the cam member 24.

In this embodiment, the position of the pressure spring 231 on the connecting bracket 22 is further defined by the adjusting screw 233 and the adjusting moving block 234.

As a further improvement of the present application, the one-way limit mechanism 26 comprises a one-way gear 261 and a one-way limiting device, the one-way gear 261 is configured to be used in cooperation with the one-way limiting device, and the connecting bracket 22 is configured to pivotally connect to the base 1 by a first rotating shaft 27, and the one-way gear 261 is configured to sleeve on the first rotating shaft 27, the one-way limiting device is arranged on the base 1, and the connecting bracket 22 is rotatably arranged on upper end of the base 1 by the first rotating shaft 27, the one-way gear 261 and the one-way limiting device.

As a further improvement of the present application, the one-way limiting device comprises a limiting member 262 and a reset spring 263, the return spring 263 is arranged inside the base 1, and one end of the limiting member 262 is connected with the reset spring 263, the other end of the limiting member 262 is configured to expose outside the base 1, and a gear rack matched with helical teeth of the one-way gear 261 is arranged on the limiting member 262.

In this embodiment, by using the one-way gear 261 and the one-way limiting device, the user can press the limiting member 262 into the base, so that a gap is generated between the helical teeth of the one-way gear 261 and the gear rack on the limiting member 262, so as to realize the adjustment. After the adjustment is completed, the limiting member 262 is reset by the reset spring 263, so that the helical teeth of the one-way gear 261 mesh with the gear rack on the limiting member 262, thereby limiting the position of the connecting bracket 22 and the base 1.

As a further improvement of the present application, a flipping adjusting device 4 is arranged between the painting plate 3 and the connecting seat 21, and the flipping adjusting device 4 comprises a flipping seat 41, a second rotating shaft 42, a torsion spring 43 and an adjusting rod 44, the flipping seat 41 is configured to pivotally connect to the connecting seat 21 by the second rotating shaft 42, the torsion spring 43 is configured to be wound around the second rotating shaft 42, and the adjusting rod 44 is configured to connect with the torsion spring 43.

In this embodiment, the torsion spring 43 is configured to loosen the second rotating shaft 42 when the adjusting rod 44 is toggled, and the second rotating shaft 42 is configured to be locked by the torsion spring 43 when the adjusting rod 42 is loosened, so as to adjust the angle between the connecting base 21 and the painting plate.

As a further improvement of the present application, a rotating adjusting device 5 is arranged between the flipping adjusting device 4 and the painting plate 3, the rotating adjusting device 5 comprises a rotating disc 51, a clamping column 52 and a limiting block 53, and one side of the rotating disc 51 is arranged on the flipping seat 41, and an oval clamping slot is provided in the middle of the flipping seat, the clamping column 52 comprises a clamping cylinder and a clamping plate, the clamping cylinder is arranged in the oval clamping slot, the clamping plate is arranged on upper end of the clamping cylinder, the width of the clamping plate is configured to be greater than outer diameter of the clamping cylinder, and other side of the rotating disk 51 and the limiting block 52 are fixed on back of the painting plate 3, a limiting clamping slot adapted to the clamping cylinder is arranged on the limiting block 53, and a notch is arranged on one side of the clamping slot, the clamping cylinder is configured to insert into the clamping slot from the notch, and the clamping plate is configured to be pressed on the limiting block 53, and the painting plate 3 is configured to clamp at the clamping cylinder of the clamping column 52 by the limiting clamping slot of the limiting block 53.

In this embodiment, the painting plate 3 is rotated around the clamping cylinder through the rotating disk 51 and the limiting block 53, and the painting plate 3 is fixed on the connecting seat 21 or the flipping adjusting device 4 through the clamping plate and the limiting block 53.

As a further improvement of the present application, the clamping plate is configured in a racetrack-like structure.

As a further improvement of the present application, further comprising a bottom plate 6.

In this embodiment, the artboard according to the present application is fixed on the desktop, the wall or the ground through the bottom plate 6, and it can also be made into a clip and clamped in different places.

The above are only the preferred embodiments of the present application, and are not intended to limit the present application. Therefore, any modification, equivalent replacement, improvement, etc. made to the above embodiments according to the technical practice of the present application still fall within the scope of the technical solution of the present application.

What is claimed is:

1. A smoothly adjustable artboard, comprising: a base configured for fixing, an adjusting bracket configured to adjust the height and angle of the artboard, and a painting plate configured to place drawing paper, and the adjusting bracket is arranged between the base and the painting plate, wherein the adjusting bracket includes a connecting seat, a connecting bracket, a force applying mechanism, a cam member, a roller and a one-way limiting mechanism, the roller is rotatably arranged on the connecting bracket and is located at one end close to the base, and one end of the force applying mechanism is connected with the connecting seat, and the other end of the force applying mechanism is connected with the cam member, wherein a curved surface of the cam member is configured to press against the roller under the pushing action of the force applying mechanism, wherein the force applying mechanism comprises a pressure spring, and one end of the pressure spring abuts against the cam member.

2. The smoothly adjustable artboard according to claim 1, wherein the force applying mechanism further comprises a limiting sleeve, an inner diameter of the limiting sleeve is configured to adapt to an outer diameter of the pressure spring, and the limiting sleeve is configured to cover on outside of the pressure spring.

3. The smoothly adjustable artboard according to claim 2, wherein the limiting sleeve is configured to be a flexible sleeve.

4. The smoothly adjustable artboard according to claim 1, wherein the force applying mechanism further comprises an adjusting screw and an adjusting moving block, and one end of the adjusting screw is configured to clamp with the connecting seat by screw head, the adjusting moving block is configured to screw on the adjusting screw, the pressure spring is configured to sleeve on outside of the adjusting screw, and both ends of the pressure spring are configured to abut between the adjusting moving block and the cam member.

5. The smoothly adjustable artboard according to claim 1, wherein one-way limit mechanism comprises a one-way gear and a one-way limiting device, the one-way gear is configured to be used in cooperation with the one-way limiting device, and the connecting bracket is configured to pivotally connect to the base by a first rotating shaft, and the one-way gear is configured to sleeve on the first rotating shaft, the one-way limiting device is arranged on the base, and the connecting bracket is rotatably arranged on upper end of the base by the first rotating shaft, the one-way gear and the one-way limiting device.

6. The smoothly adjustable artboard according to claim 5, wherein the one-way limiting device comprises a limiting member and a reset spring, the reset spring is arranged inside the base, and one end of the limiting member is connected with the reset spring, the other end of the limiting member is configured to expose outside the base, and a gear rack matched with helical teeth of the one-way gear is arranged on the limiting member.

7. The smoothly adjustable artboard according to claim 1, wherein a flipping adjusting device is arranged between the painting plate and the connecting seat, and the flipping adjusting device comprises a flipping seat, a second rotating shaft, a torsion spring and an adjusting rod, the flipping seat is configured to pivotally connect to the connecting seat by the second rotating shaft, the torsion spring is configured to be wound around the second rotating shaft, and the adjusting rod is configured to connect with the torsion spring, the torsion spring is configured to loosen the second rotating shaft when the adjusting rod is toggled, and the second rotating shaft is configured to be locked by the torsion spring when the adjusting rod is loosened.

8. The smoothly adjustable artboard according to claim 7, wherein a rotating adjusting device is arranged between the flipping adjusting device and the painting plate, the rotating adjusting device comprises a rotating disc, a clamping column and a limiting block, and one side of the rotating disc is arranged on the flipping seat, and an oval clamping slot is provided in the middle of the flipping seat, the clamping column comprises a clamping cylinder and a clamping plate, the clamping cylinder is arranged in the oval clamping slot, the clamping plate is arranged on upper end of the clamping cylinder, the width of the clamping plate is configured to be greater than outer diameter of the clamping cylinder, and other side of the rotating disk and the limiting block are fixed on back of the painting plate, a limiting clamping slot adapted to the clamping cylinder is arranged on the limiting block, and a notch is arranged on one side of the clamping slot, the clamping cylinder is configured to insert into the clamping slot from the notch, and the clamping plate is configured to be pressed on the limiting block, and the painting plate is configured to clamp at the clamping cylinder of the clamping column by the limiting clamping slot of the limiting block.

9. The smoothly adjustable artboard according to claim 8, wherein the clamping plate is configured in a racetrack-like racetrack-shaped structure.

\* \* \* \* \*